United States Patent [19]

Kurschatke et al.

[11] Patent Number: 5,455,992
[45] Date of Patent: Oct. 10, 1995

[54] ROLLER ASSEMBLY FOR EXPANDING THE WIDTH OF A WEB

[75] Inventors: Wolfgang Kurschatke; Axel Schneider, both of Krefeld; Günter Von Harten, Kaarst; Christian Meyer, Viersen-Dülken; Klaus Kadagies, Krefeld, all of Germany

[73] Assignee: Eduard Küsters Maschinenfabrik GmbH & Co. KG, Krefeld, Germany

[21] Appl. No.: 170,311

[22] PCT Filed: Jun. 27, 1992

[86] PCT No.: PCT/DE92/00533

§ 371 Date: Apr. 26, 1994

§ 102(e) Date: Apr. 26, 1994

[87] PCT Pub. No.: WO93/01344

PCT Pub. Date: Jan. 21, 1993

[30] Foreign Application Priority Data

Jul. 4, 1991 [DE] Germany .................. 41 22 121.4

[51] Int. Cl.⁶ .................................................. D06C 3/06
[52] U.S. Cl. .................................................. 26/99; 26/87
[58] Field of Search ............................ 26/71, 72, 87,
26/99; 492/30, 33, 34, 35, 39; 223/32;
264/288.4, 290.2, 289.6, 291

[56] References Cited

U.S. PATENT DOCUMENTS

| 634,307 | 10/1899 | Neidhardt | 26/99 |
|---|---|---|---|
| 679,425 | 7/1901 | Kertesz | 26/99 |
| 3,499,185 | 3/1970 | Schmidt et al. | 18/1 |
| 3,652,002 | 3/1972 | Dennis | 226/172 |
| 4,087,226 | 5/1978 | Mercer | 26/99 |
| 4,116,892 | 9/1978 | Schwarz | 26/99 |
| 4,368,565 | 1/1983 | Schwarz | 26/99 |

FOREIGN PATENT DOCUMENTS

| 2613822 | 9/1980 | France . | |
|---|---|---|---|
| 0003067 | 1/1885 | Germany . | |
| 830413 | 1/1952 | Germany | 26/99 |
| 2722260 | 9/1968 | U.S.S.R. | 26/99 |
| 14608 | of 1884 | United Kingdom | 26/99 |
| 1140030 | 1/1969 | United Kingdom . | |
| 1149746 | 4/1969 | United Kingdom . | |
| 2093490 | 9/1982 | United Kingdom . | |

OTHER PUBLICATIONS

Sonderdruck Aus Textilbetrieb, Vogel–Verlag, Wuerzburg, Germany, vol. 95, No. 1/Feb. 1977: *Das ML–(Mikrolängungs–) Verfahren*.

*Primary Examiner*—Jeanette E. Chapman
*Assistant Examiner*—Amy Brooke Vanatta
*Attorney, Agent, or Firm*—Kenyon & Kenyon

[57] ABSTRACT

A widening device for increasing the width of a moving web of material comprises a rotatable profiled roller, the outer surface of which defines a plurality of radial projections and recesses distributed along the length of the roller and first and second co-operating rollers rotatable at the same speed as the profiled roller. The first and second co-operating rollers define projections and recesses complementary to those of profiled roller and define first and second treatment nips which serve to increase the width of a web of material passed therethrough. The projections on the co-operating roller defining the second treatment nip extend more deeply into the recesses of the profiled roller than do the projections on the co-operating roller which defines the first treatment nip so that the web of material is stretched gradually over two stages with the stretching effect being uniform across the entire width of the web.

30 Claims, 7 Drawing Sheets

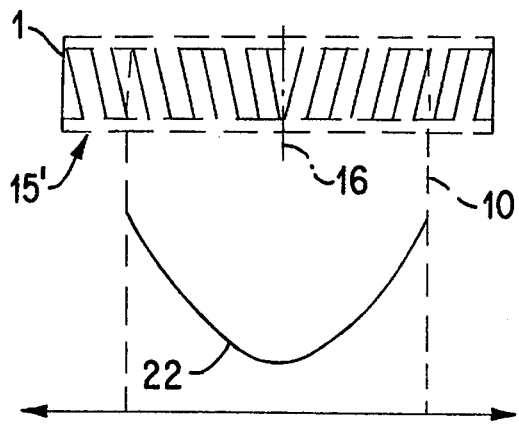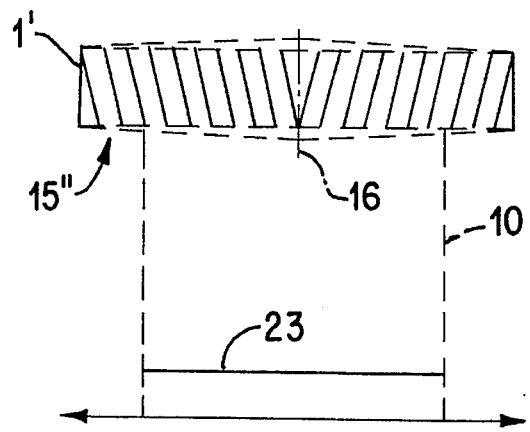
FIG. 12   FIG. 13
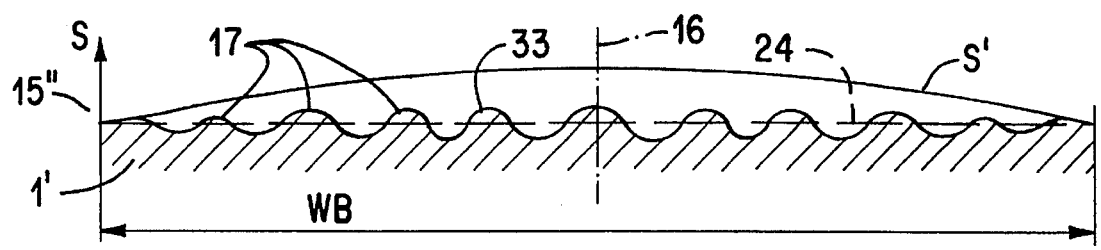
FIG. 14
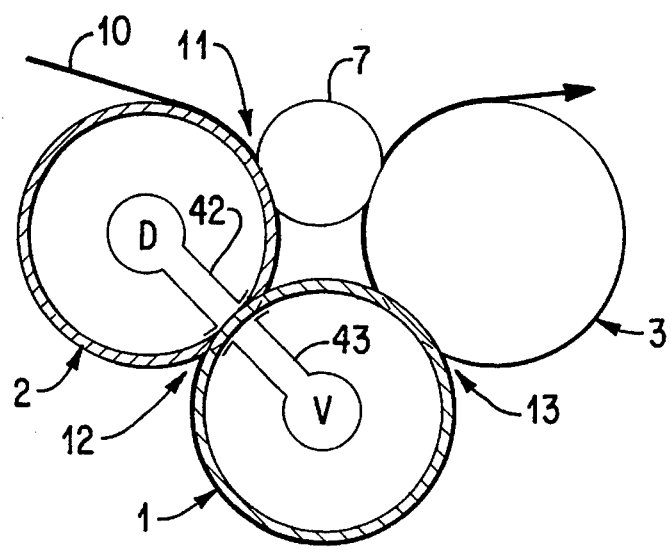
FIG. 15

ROLLER ASSEMBLY FOR EXPANDING THE WIDTH OF A WEB

THE PRESENT INVENTION relates to a widening device and more particularly a widening device for increasing the width of a moving web of material.

DE-PS 30 067 discloses a widening or width-extending device in which a textile web of material is unwound from a roll, conveyed through the nip between co-operating profiled rollers, and rewound. A width-stretching device can be disposed in front of and behind the nip. The co-operating rollers have their periphery formed with a helical relief extending from the centre of the rollers outwards to both sides and with a constant pitch, but opposite on either side of the centre. This relief meshes with a corresponding relief on the co-operating roller, so that the peaks of the relief on one roller engage in the troughs between the peaks of the relief on the other roller. The two rollers can be adjusted relative to one another in a controlled manner.

For the purposes of the following description, the term "width-extending or extension" means transverse stretching, i.e. a change in the dimensions of the web of material in the width direction, and is associated with considerable stretching forces exerted across the material. In contrast the term "width stretching" is used to describe the operation where a web which is not completely flat is simply spread out and flattened, when only relatively small forces are exerted across the web.

The "width-extending" effect, in the present sense, of the known device is based on the fact that the web, which would normally be flat when running through the nip, is pressed by the peaks on one roller into the troughs the peaks on the other roller. In the process it is held by friction against neighbouring peaks, so that penetration is opposed by a force which results in stretching. The web extends in a zigzag in the nip, and where there is no substantial change in the position of the edges, the result is, of course, a greater extension of the web in the width direction, i.e. the web is transversely stretched. The amount of transverse stretching depends on the extent to which the helical reliefs on the two co-operating rollers engage in one another. If the engagement is deep, the web may quite possibly be torn into longitudinal strips.

The aim of the known device is to equalise the locally attainable width extension across the web. Another width-extending device is a tentering frame having tenterhooks which engage the edges of the web and pull them apart. This however results in an approximately hyperbolic variation in stretch across the width. The stretching at the edge is greatest and there the weft density of the finished product is considerably smaller. These differences in stretching also show up when the web has been treated, e.g. in the colour shade.

In the case of the width-extending device of DE-PS 30 067, stretching occurs at a number of places uniformly distributed across the web between each pair of peaks, which are separated by about 1 to 2 cm. The forces are applied, not at widely distant places but in the immediate neighbourhood of each place under consideration. The conditions are the same at all places, at least within the width of the web. The resulting stretching is correspondingly constant. The places where force is applied are much less stressed than in the tentering frame, because instead of forces being applied at two locations, (at the edge of the web), it is applied at about a hundred positions following one another in line along the width-extending nip.

DE-PS 30 067 dates from the year 1884. In the meantime the effect attainable by the device has been given new importance by the "micro-elongation" (abbreviation ML) process (see Textilbetrieb 95 (1977), pages 58 to 60). The aim is to increase the width of the product without reducing the length, or to retain a given width in order to counteract shrinkage during the various textile wet-treatment processes. The intention is to increase the area of the high-finished final product by a small percentage. The ML process is performed on a device substantially similar to that in DE-PS 30 067.

In spite of the worthy object of increasing the useful area of the product by a small percentage, thus justifying considerable investment, the ML process has not been successful in practice. The reason is that although the product can be uniformly stretched in the desired manner inside the width of the web, the effect is not maintained at the edge, because when the web is subjected to tensile stresses the edge is pulled into the width-extending nip from the side, because the tensile stresses at the edge cannot be counteracted by any opposing forces. The stretch obtainable by the known device is therefore in the form of a curve symmetrical towards the middle and falling at the edges. This non-uniform stretching has such an effect on the result of treatment that the product cannot satisfy stringent requirements.

Attempts have been made to hold the material particularly firmly at the edge, by inserting elastic rings into the troughs in the relief on one roller, so as to abut the peaks on the relief in the other roller forming the nip. In this manner the material is firmly clamped at the edge and cannot slide inwards. This remedy, however, is suitable only for one width of web, and considerable work is involved in attaching and adjusting the elastic rings.

DE-AS 26 13 822 discloses another width-extending device in which a smooth cylindrical pressure roller presses externally on the peaks of the relief on a roller over which the web runs, in the part of the roller covered by the web, and clamps the web between it and the peaks at a number of positions across the web, and also at the edge. The peaks have the same radial height, measured from the roller axis. This results in a number of securing or retaining points across the width of the web, and at these points the web cannot be displaced in the width direction. These securing or retaining points are disposed very near the width-extending nip. Accordingly when the web runs into the nip, its edge can only follow the transverse tensile forces resulting from engagement of the relief to a very limited extent, and is prevented from sliding into the nip from the sides. In this manner the stretch resulting from "engagement" of the reliefs on the co-operating rollers is equalized across the width and, more particularly, is also maintained at the edge. Accordingly, the pressure roller, having the same length as the co-operating relief rollers, enables the co-operating relief rollers to produce useful "micro-elongation" in the transverse direction of the web. This effect can be achieved with various widths of processed webs, without the need for any adjustment.

Now that the uniformity of stretching has been substantially increased by the pressure roller as per DE-AS 26 13 822, the remaining problem is that if the required stretching is performed in a single step, the web material will be considerably stressed, possibly up to the limit of its tensile strength.

The aim of the invention is to provide an improved width-extending device which addresses this problem so that the effect on the web is gentler.

SUMMARY OF THE INVENTION

There is provided a device for increasing the width of a moving web of material, the device comprising a rotatable profiled roller, the outer surface of which defines a primary plurality of radial projections and recesses distributed along the length of the roller. First and second co-operating rollers are provided rotatable at the same speed as the profiled roller, defining first and second treatment nips with the profiled roller. The nips serve to increase the width of a web of material passed therethrough. The surface of each co-operating roller defines first and second projections and recesses complimentary to the projections and recesses of the profiled roller such that the projections on each of the co-operating rollers extend into the recesses of the profiled roller without contact. The projections on the second co-operating roller extend more deeply into the recesses of the profiled roller than the projections on the first co-operating roller. The device is constructed so that, in use, a web of material, the width of which is to be increased, is passed through the first treatment nip defined between the first co-operating roller and the profiled roller and then passes around part of the profiled roller before passing through the second treatment nip defined between the second co-operating roller and the profiled roller.

In an arrangement of this kind, two width-extending nips are present and the desired total stretching can be brought about, without considerable additional complication, in two stages. Between the stages web can mechanically "recover", particularly if the web runs through a liquid bath between stretching operations.

Preferably the device incorporates a pressure element which engages firmly against a web of material passing through the first and second treatment nips at a position relatively close to the nips, the pressure element being movable with the moving web of material and having a pressure surface which forces the web of material against the co-operating rollers.

Preferably a single pressure element engages the web of material at two positions, first as it passes around the first co-operating roller and second as it passes around the second co-operating roller.

The invention provides uniform stretching across the web without stressing the web unduly. It has been found that the invention can improve the penetration of liquid or gaseous substances into the material and into the fibres and filaments, and the stretching can be effective before, during or after the substances are supplied.

The pressure element may have an unbroken or smooth pressure surface. This embodiment is the easiest to manufacture and produces uniform pressure if the raised portions of the reliefs on the co-operating rollers lie in a cylindrical surface.

Alternatively the pressure element may have a perforated pressure surface. During stretching, a treatment medium can be supplied or discharged through the perforations.

A pressure element performing this function substantially without friction can have various geometrical shapes.

In one preferred embodiment the pressure element is a pressure roller extending over the length of the co-operating rollers. This roller produces a linear or very narrow pressure zone extending along the pressure roller.

Preferably the pressure roller has a flexible coating with a hardness of 50 to 70 Shore D. This provides uniform pressure and retention of the web.

The pressure roller will usually be a naturally rigid cylindrical roller of conventional kind. This implies, however, that the raised portions of the relief on the co-operating roller lie in a cylindrical surface, though this is not always so. The pressure roller may therefore be divided into longitudinal portions, with the axes of the longitudinal portions being movable at an angle with respect to one another. Thus the pressure roller may be a width-extending roller.

In an alternative embodiment, the pressure element is an endless rotating belt approximately equal in width to the length of the co-operating rollers, the belt engaging the outer surface of the co-operating rollers. The belt provides a pressure region over a larger peripheral angle, as compared with a pressure roller.

The belt, besides increasing the pressure area and thus more efficiently securing the web in the transverse direction, has further advantages in that the web is supported without a break in the pressure region. This may be an advantage in certain forms of treatment with a liquid medium during width extension. It is not necessary, however, for the belt to have an unbroken surface; it can be perforated or have a surface relief like the pressure roller.

In one arrangement, the radial projections and recesses defined by the outer surfaces of the profiled roller and the co-operating rollers form a relief and comprise continuous ribs extending around the periphery of the rollers.

While the width-extending device can have ribs extending in planes at right angles to the axis, in practice there is a risk of longitudinal markings on the web. Preferably therefore the relief is a helix, which can be continuous without any transverse transport effect and without marking. Alternatively the helical relief can be as per DE-PS 30 067, in which the turns of the helix have an opposite but equal pitch from the centre outwards.

In a different arrangement, the radial projections and recesses defined by the outer surfaces of the profiled roller and the co-operating rollers form a relief and comprise individual raised portions uniformly distributed over the roller surface, the raised portions being spaced from one another in the longitudinal and peripheral directions.

The individual raised portions may take the form of knobs or diamond-shaped lands.

The only general limitation to the shape of the relief is that it must be able to extend the width and ensure mutual engagement during rotation without touching of flanks.

Preferably the radial projections defined by the outer surface of each roller have peaks which are spaced apart in the longitudinal direction of the roller by a distance of between 5 and 30 mm.

Conveniently, the radial projections define peaks and the radial recesses define troughs, the peaks and troughs each lying on an imaginary cylindrical surface and the radial distance between the cylindrical surfaces is between 5 and 20 mm.

These dimensions relate to the conventional dimensions of woven textile webs, which are up to 2 m wide.

Advantageously the peaks of the raised portions are rounded, to prevent excessive friction or even cutting stresses on the web at the edges of the raised portions over which the web is drawn under tension between the raised portions.

Various textile webs offer differing resistance to treatment in the width-extending nip. In spite of the already-achieved equalization of local stretching across the web by the pressure element, some webs exert such strong forces counteracting effective stretching that there is always an appreciable decrease in stretch towards the end.

The depth of penetration of the projections on the co-operating rollers in the recesses of the profiled roller may decrease towards the ends of the rollers. This feature may be of interest even where there is no pressure roller or belt, and has the effect, that at the sides the engagement is less deep and the transverse stretching of the web is correspondingly less. Then the otherwise hyperbolic variation is counteracted. The amount of decrease in the peak height and the distribution of the increase across the web will be determined in individual cases in accordance with the properties of the materials being processed. If a pressure roller is present and if the outer periphery of the profiled roller is not cylindrical, the pressure roller must adapt to the shape of the profiled roller.

Thus, the peaks of the projections on the roller surfaces may lie on a surface of rotation which is symmetrical about a central plane extending at right angles to the longitudinal axis of the roller, with the radius of the surface of rotation increasing in a direction from the ends of the roller towards the central plane of the roller.

A device for supplying a liquid treatment medium to the web may be provided near one of the treatment nips.

Preferably the device supplies the liquid treatment medium to the web before it enters the nip. The treatment medium can advantageously influence the stretching process. The medium may be water or an alkaline liquid supplied in a quantity of 50 to 300% of the dry weight of material at temperatures of 15° C. to 100° C., preferably about 80° C.

A device for sucking a liquid treatment medium through the web may be provided near one of the treatment nips. The suction device is used for distributing a sprayed or otherwise applied treatment medium through the thickness of the web.

Preferably at least one of the rollers forming the first treatment nip is perforated and the interior of the roller is connected to a device for blowing a liquid treatment medium out or sucking it in.

Most preferably, one of the rollers forming the first treatment nip is connected to a device for blowing out a liquid treatment medium towards the nip, and the other roller is connected to a device for sucking in a liquid treatment medium from the nip. This results in an intense flow through the web at the moment when it is transversely stretched.

Conveniently a web of material passing through the device extends around the outer surface of the profiled roller by an angle $\alpha$, and around the outer surfaces of the first and second co-operating rollers by angles $\beta$ and $\gamma$ respectively, the angle $\alpha$ being equal to the sum of the angles $\beta$ and $\gamma$. This avoids warping of the web where the profiled and co-operating rollers have a surface relief defined by helical ribs.

Advantageously, at least the profiled roller dips at least partly into a treatment liquid. In this way, width extension of the web is combined with treatment of the web with a liquid.

Since the profiled roller is dipped into the treatment liquid the part of the web of material which is passed around the profiled roller is further impregnated with the treatment liquid during or after passing through the treatment nip. This assists in the treatment of the web with the liquid or in the recovery of the web material between successive stretching operations.

Preferably the rollers are adjustable to provide a predetermined depth of penetration of the radial projections on one roller into the radial recesses of another roller with which a nip is defined.

The simplest arrangement is to continuously adjust the rollers to provide the desired depth of engagement and this may, for example, be effected by means of spindle drives engaging the ends of the rollers. A user who is very familiar with the characteristics of the articles which are to be treated can adopt this procedure if he knows the maximum weft thread stress which the material can withstand. It is then possible to set a working condition at which the stress is, of course, at a safe level below the level at which damage would occur.

Alternatively the rollers may be adjustable to provide a predetermined force urging the rollers defining a nip towards each other. This is a better way of adapting the working conditions to the properties of the material and also gives greater protection against tearing of the web.

In this case it is the web itself which will determine the depth of penetration of the relief in the nip and will also determine the adjustment of the stretching which is achieved. Instead of the predetermined force being set and adjusted externally or manually, for example on the basis of values derived from experience, a computer can be provided to analyze the variation in the force of extension when the force is increased on a given material. If the material begins to tear, i.e. if the increase in force is no longer proportional to stretching within the elastic region, a limiting value will have been reached and the computer will provide a command to a regulator for the force not to exceed a predetermined limit which is of course less than the maximum tolerable value by an appropriate safety margin. In this way stretching of the web can be adjusted completely automatically in a precise manner without the risk of damaging the properties of the individual product being treated.

In order to provide automatic operation it is desirable for the device to be associated with a batch identification device which responds to markings on the web and which is used to control the adjustment of the rollers. The batch-identification device may respond to markings at the beginning and the end of a portion of web, for example, the front or the rear of a batch. The device will be used automatically to adjust the nip as necessary, e.g. to initiate 'infeed' or rapid ventilation.

The increase in area of the web of material as a result of the width-extension is of importance and it is therefore convenient that the device is associated with a device for measuring the moving web, the measuring device being connected to a device for controlling the rollers.

Preferably the device is disposed in front of a width-stretching device. After leaving the second treatment or width-extending nip, the web has a corrugated form with peaks and troughs in the longitudinal direction and passing the web through the width-stretching device prevents the web from creasing which could otherwise cause difficulties during subsequent treatment when the web runs in a continuous plant. The width-stretching device transversely spreads and flattens the web.

The device of this invention may be used at various locations in a continuous treatment plant.

Thus the device may be disposed in front of a mangle or may be disposed in front of a steam box, outside the casing thereof or may be disposed in front of the actual recovery section in a steam box.

BRIEF DESCRIPTION OF THE DRAWINGS

FIG. 12 shows the variation in stretching of a web when the depth of engagement between co-operating rollers shows uniform across the web width;

FIG. 13 shows the variation in stretching of a web when the depth of engagement between co-operating rollers differs across the web width;

FIG. 14 is a longitudinal cross-section through the axis of a roller, showing the helical relief on the outer surface thereof which corresponds with the arrangement shown in FIG. 13;

FIG. 15 shows a sectional view corresponding to FIG. 1 but showing an embodiment of the device which incorporates perforated rollers.

DETAILED DESCRIPTION

Figure 1:
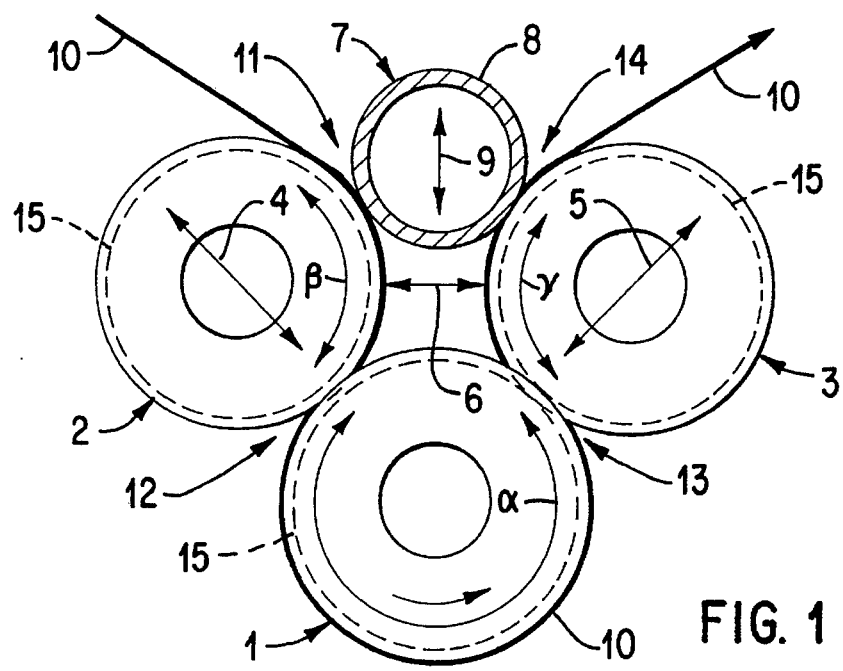
FIG. 1 shows a side view of a device in accordance with the present invention for increasing the width of a moving web of material.

FIG. 1 shows the basic features of a width extending device 100 which comprises a profiled roller 1 and two co-operating rollers 2, 3. The co-operating rollers extend parallel to each other and to the profiled roller 1 and are located at the same height slightly above the level of the profiled roller 1 and on either side thereof. Thus, the co-operating rollers 2, 3 may be considered to be located adjacent respective upper 'quadrants' of the profiled roller 1 with each roller 2, 3 being located at about 45° around the upper surface of the roller 1 from the uppermost point thereof. The co-operating rollers 2, 3 are each independently adjustable in the direction of arrows 4, 5 relative to the profiled roller 1, in order to vary the degree of engagement with the roller 1. The outer surfaces of the co-operating rollers 2, 3 are spaced apart by a distance 6 in the transverse direction. A pressure roller 7 is guided in the direction of arrow 9 and is pressed against the co-operating rollers 2, 3 from above either under its own weight or under the action of external forces. The external diameter of the roller 7 is greater than the distance 6 between the outer surfaces of the co-operating rollers 2, 3.

A web of material 10 travels through the width extending device 100 in a twisting manner, as shown in FIG. 1. Thus the web passes firstly through a nip 11 between the co-operating roller 2 and the pressure roller 7, then through a width-extending nip 12 between the co-operating roller 2 and the profiled roller 1. Then the web loops around the bottom part of the profiled roller 1 and passes through a second width extending nip 13 between the co-operating roller 3 and the profiled roller 1 and then leaves the width extending device 100 after passing through a nip 14 between the co-operating roller 3 and the pressure roller 7. To avoid warping, the web is guided through the device so that the angle $\alpha$ over which the web engages the bottom part of the profiled roller 1 is equal to the sum of the angles $\beta$ and $\gamma$ over which the web engages the co-operating rollers 2 and 3.

In the region in which the incoming web 10 engages the co-operating roller 2 and before the web 10 reaches the nip 12, the pressure roller presses externally against the web which is, of course, supported on the outer surface of the co-operating roller 2. The roller 7 has a relatively soft flat cylindrical coating 8 on its outer periphery (the coating having a hardness of approximately 60 Shore D). Similarly the pressure roller 7 presses the web 10 against the co-operating roller 3 in the region where the web leaves the width-extending nip 13.

Figure 2:
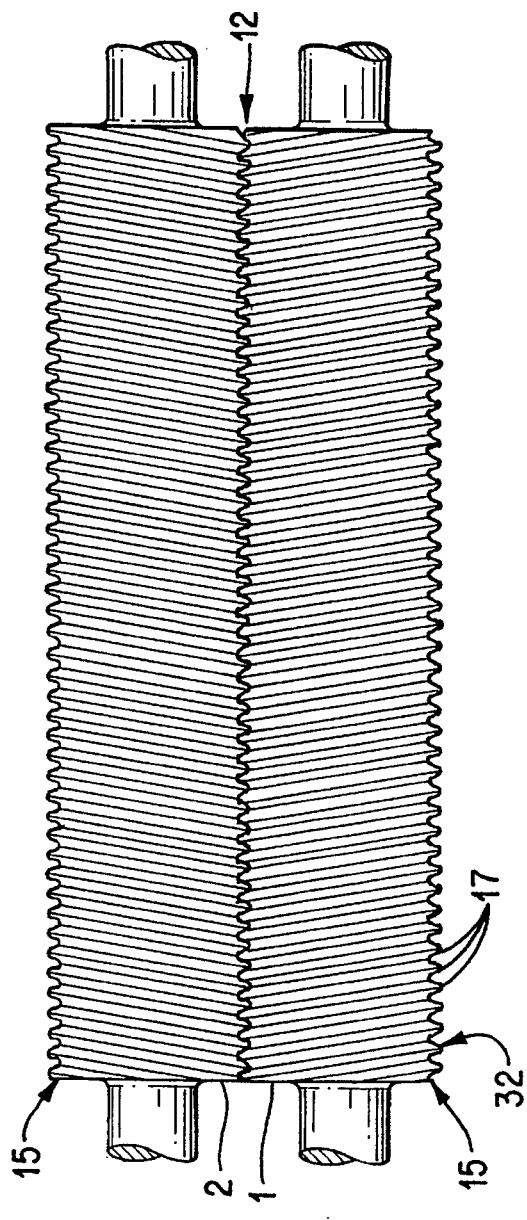
FIG. 2 shows a view of the two co-operating rollers shown at the bottom on the left in FIG. 1 of the drawings, the rollers being formed with a helical relief on their outer surfaces.
Figure 3:
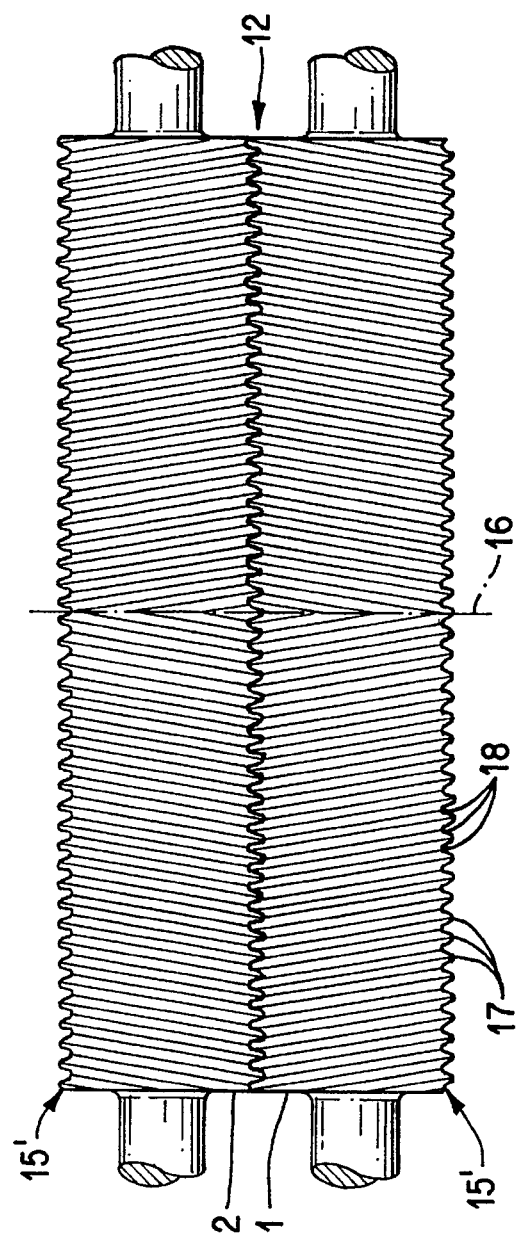
FIG. 3 shows a view corresponding to FIG. 2 but showing a modified embodiment.

In the embodiment shown, the rollers 1, 2, 3 are of approximately the same diameter and each roller has a uniform helical relief 15 formed in its periphery, as shown in FIGS. 2 and 3 for rollers 1 and 2. The arrangement is the same for rollers 1 and 3.

In the embodiment of FIG. 2 the basic shape of the roller is substantially cylindrical and the helical relief 15 is in the form of an external rib 32 which extends in a helix surrounding the roller body. The working width of the roller is approximately 2 m. The distance between adjacent turns of the helix, i.e. the axial distance from one rib peak to the next, is about 15 mm, resulting in a total of about 130 rib peaks along the roller length. Thus FIGS. 2 and 3 are not shown to scale.

The rollers 1 and 2 of FIG. 2 are of similar form having complementary reliefs formed in their periphery with the helical turns of the reliefs "engaging" as shown in FIG. 2. The rollers 1, 2 are designed to rotate relative to one another at the same speed without the flanks of the helical relief 15 coming into engagement. Thus, while reference may be made to the reliefs or the rollers engaging, it should be appreciated that there is no actual contact. There is instead 'meshing' of the reliefs. During rotation of the rollers 1, 2 the width-extending nip 12 retains its corrugated shape and uniform width.

FIG. 3 shows an alternative embodiment of a helical relief 15'. Each cylindrical roller 1, 2 has helical turns, extending outwards from a centre plane 16 which is perpendicular to the roller axis. The pitch to peak height S, i.e. the difference in radius between peaks 17 and troughs 18 of the helix is constant on both sides of the plane 16, but the pitch on the two sides has opposite signs, that is to say the helical relief 15' starting from the centre plane 16 has a right hand thread on one side and a left hand thread on the other side. The relief 15' on the co-operating rollers 1, 2 in FIG. 3 are similar and engage in the manner shown in FIG. 3 in that the peaks of the relief on roller 2 enter the troughs on the relief of roller 1. No contact occurs since this would result in damage to the web (which is not shown in FIGS. 2 and 3) guided in the space between the rollers.

In the embodiments of FIGS. 2 and 3 the rollers 1, 2 can rotate relative to one another at the same peripheral speed, whereupon the helical reliefs 15, 15' move to the side. This occurs in one direction in the FIG. 2 embodiment and in both directions away from the centre plane 16 in the FIG. 3 embodiment. During this motion the point of engagement of the peaks of the reliefs on the web 10 changes in the lateral direction. The only purpose of the helical relief is to avoid longitudinal markings on the web. The helical shape of the reliefs 15, 15' is not essential for width extension. Also the helical reliefs 15, 15' do not transversely move the web 10.

Figure 4:
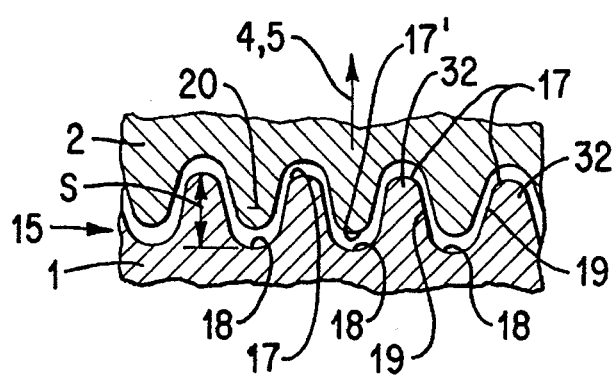
FIG. 4 shows a partial, cross-sectional view in the region of engagement of the co-operating rollers, the section being taken in a plane through the axis of the rollers.
Figure 5:
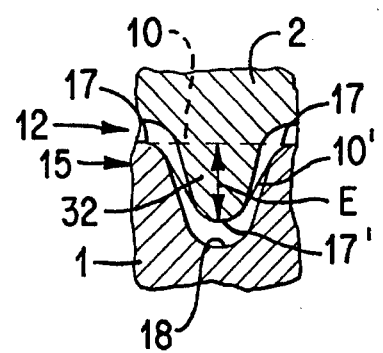
FIGS. 5 and 6 show partial cross-sectional views through individual turns of the helix on the outer surfaces of the co-operating rollers, the two views showing differing depths of engagement between the rollers.
Figure 6:
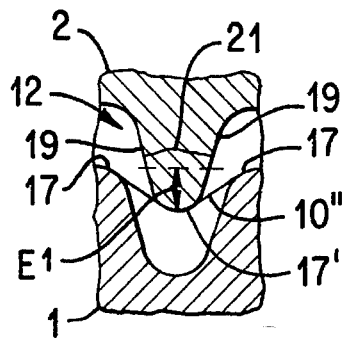

The width extension of the web depends upon the mutual depth of engagement E, E', as shown in FIGS. 4 to 6.

If the web 10 were guided over the profiled roller 1 in FIG. 5 without a co-operating roller, then it would rest on the peaks 17 of the helical profile 15 (or 15') as indicated by the chain-dotted line 10 in FIG. 5. If the co-operating roller 2 is disposed opposite the profiled roller 1 in the nip 12 and the peaks 17' penetrate into the troughs 18 in the profiled roller 1 (as shown in FIG. 5), then the web 10 will no longer follow the chain-dotted imaginary course 10 but will follow the continuous line course 10' where the length of web in the width direction between the peaks 17 is increased, i.e., the web 10 has been stretched in the width direction between the peaks 17. When the peaks 17' penetrate into the troughs 18, the web 10 is held by friction against neighbouring peaks 17, producing forces which counteract the stretching forces. One important feature is that the stretching occurs between each pair of securing or retaining points constituted by the peaks 17. There are about 100 such points present along the length of the rollers 1, 2 or over the width of the web.

The amount of stretching depends on the depth of penetration E of the peaks 17'. In FIG. 6 the depth of penetration E' of peak 17 into trough 18 is less than in FIG. 5 and the web follows the course marked 10" which involves less stretching between the peaks 17.

In the embodiment of FIGS. 4 to 6, the peaks 17 and the troughs 18 are in the form of arcs connected by tangential sloping surfaces 19, when considered in the longitudinal section through the axis of the roller. The angle between the sloping surfaces 19 on either side of one peak is marked 21 in FIG. 6 and is equal to about 40°. By way of example, FIG. 4 also shows another possible embodiment in which the troughs and peaks 20 (shown in dotted line) are in the form of semi-circles merging directly into one another. The peaks and troughs may, of course, take other forms and may be of mixed shapes. The radii of the troughs 18 are greater than the radii of the associated peaks 20 because, even at the maximum adjustment, a space must be left for the web between the rollers 1 and 2. If there was contact between the reliefs on the two rollers 1, 2 which co-operate to define the width-extending nip 12, the web would be damaged at the point of contact.

FIG. 4 shows, approximately true to size, the helical relief used for a conventional textile web 10 of the kind in question. The longitudinal distance between the peaks 17 is about 15 mm and the peak height S is about 10 mm with the relief being provided on a roller about 2 m long. The helical relief can be turned in the periphery of a roll made of corrosion-resistant steel or may be formed by winding a suitably profiled wire onto the cylindrical body of the roller. Alternatively the helical relief 15 can be formed in a plastic coating for the roller.

Figure 7:
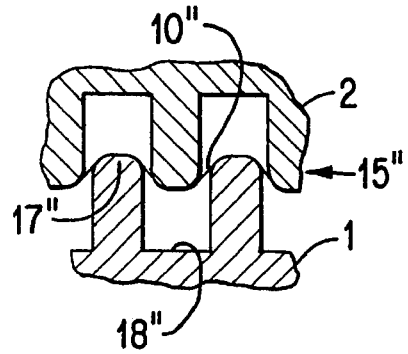
FIG. 7 shows a view corresponding to FIGS. 5 and 6 but showing helical turns having a different cross-section.

FIG. 7 shows an alternative relief shape 15" in which the ribs 17" and troughs 18" have a substantially rectangular cross-section in a plane passing through the longitudinal axis of the roller, the ribs 17" being narrower than the troughs 18". The ribs 17" are rounded at their outer edges so that the web follows the course identified by reference numeral 10'". In the embodiment shown in the drawings, the flanks of the ribs, which are constituted by the longer sides of the rectangle, are at right angles to the roller axis.

Figure 8:
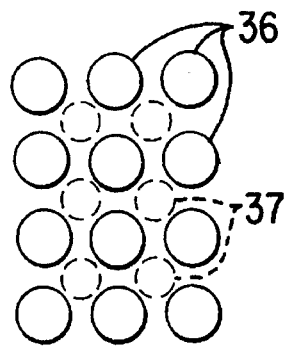
FIGS. 8 to 10 show varying embodiments of the relief formed on the outer surfaces of the co-operating rollers.
Figure 9:
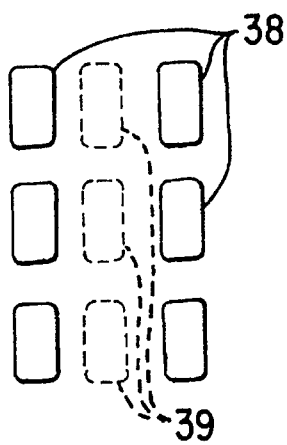
Figure 10:
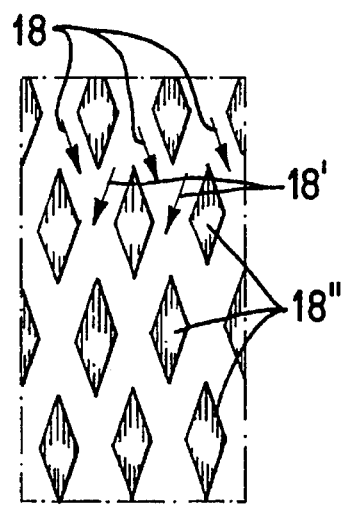

FIGS. 8 to 10 show examples of other types of relief which may be provided on the profiled roller 1 and the co-operating roller 2. In these examples the relief does not have a continuous peripheral rib. Instead, in FIG. 8 the relief on the profiled roller 1 is constituted by 'knobs' which extend in a straight line in both the longitudinal and in the peripheral direction, the knobs having a circular cross-section as seen in the radial direction and being of substantially conical shape. These knobs 36 engage between corresponding knobs 37 (shown by chain lines in FIG. 8) provided on the co-operating roller 2 so that a knob 37 on the co-operating roller always fits exactly between four knobs 36 disposed in a square on the profiled roller 1. In FIG. 9, knobs 38 are provided on the profiled roller 1 which have a generally rectangular cross-section, the knobs having longitudinal sides which extend in the peripheral direction and which are in a line in the same cross-sectional plane. Adjacent knobs 38 in different cross-sectional planes lie on parallel straight lines which extend parallel to the roller axis. Corresponding knobs 39 (shown in chain-dotted lines) are provided on the co-operating roller and each knob 39 lies between two adjacent knobs 38 in the longitudinal direction of the profiled roller 1. In FIG. 10 the relief is defined by helical grooves which form left-threaded troughs 18 and right-threaded troughs 18' so as to define diamond-shaped lands 18" which co-operate with a complementary relief, i.e. a helical relief, formed in a co-operating roller. This relief leaves many spaces between the lands 18" through which a liquid treatment medium may flow.

It is to be appreciated that the terms 'profiled roller' and 'co-operating roller' denote a linguistic and not a functional distinction in this description. In practice the co-operating rollers are, of course, also profiled rollers and define a relief in their outer surface which is complementary to that defined in the surface of the profiled roller.

Thus, the rollers 1, 2 which form the width-extending nip 12 are identical with one another and are interchangeable or are at least complementary.

Figure 11:
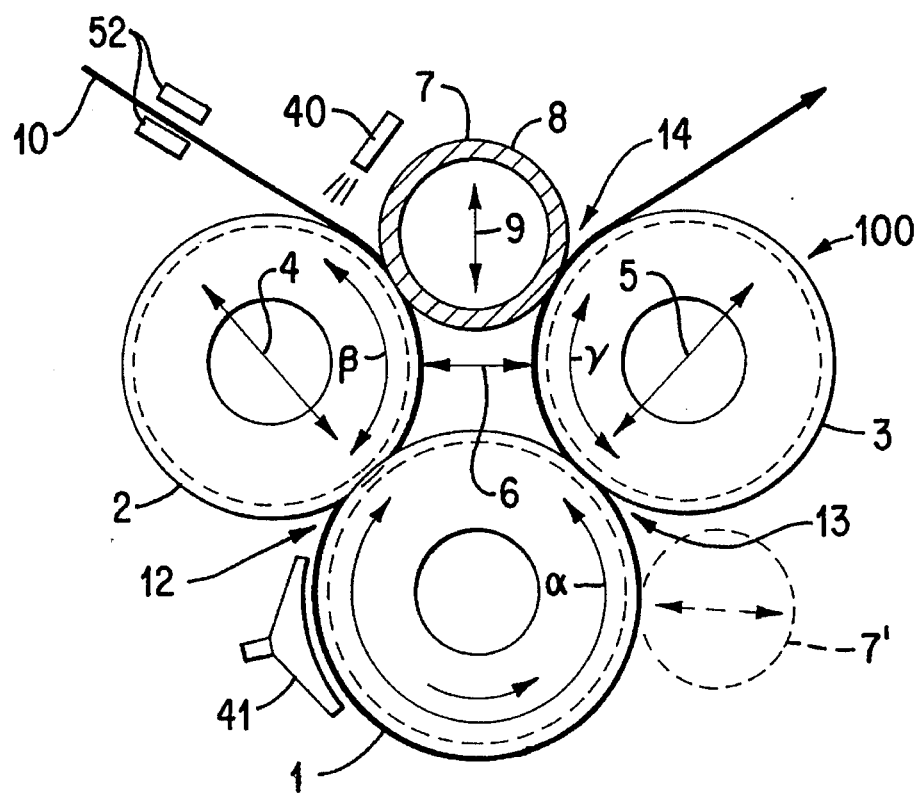
FIG. 11 shows a side view corresponding to FIG. 1 where the device is additionally provided with spray devices.

FIG. 11 shows an embodiment in which the width-extending device is additionally provided with spray devices 40, 41 for directing fluid treatment media, such as hot water or steam onto the web 10. The spray device 40 comprises a nozzle directed towards the web 10 at the point where it passes over the co-operating roller 2 before entering the nip 11 defined with the pressure roller 7. The spray device 41 is a form of steam cone which is directed towards the profiled roller 1 at a position downstream of the width-extending nip 12. Directing steam onto the web 10 at this position helps to relieve tension in the web 10.

An additional pressure roller 7' may advantageously be placed in engagement with the profiled roller 1 at a position where the web 10 passes around the bottom part of the profiled roller just before the web enters the second width-extending nip 13. This additional pressure roller is shown by chain lines in FIG. 11.

The embodiment of FIG. 11 also incorporates a batch-identification device 52 which recognizes markings on the web 10 and delivers signals for the automatic adjustment of the width-extending nips 12, 13 upon recognition of the web markings.

The co-operating rollers 2, 3 are designed to be positionally adjusted in the direction of arrows 4 to 5 so that the depth of engagement E of the co-operating roller 3 in the second nip 13 is greater than the depth of engagement E of the co-operating roller 2 in the first nip 12 so that the desired total width extension can be achieved in two stages.

FIG. 12 shows a roller 1 having a helical profile 15' which corresponds to that shown in FIG. 3 and which, apart from the change in direction of rotation of the helical profile at the central plane 16, has uniform helical turns with a uniform peak height S across its width. In FIG. 12 the edges of a web 10 are shown by broken lines and the web 10 is secured at its lateral edges on the roller 1 and on a co-operating roller by means of elastic rings. The resulting distribution of stretching 22 when the web passes through a width-extending nip made up of rollers 1, 2 of this type, is plotted in FIG. 12 for each position across the width of the web. It is found is practice that the stretching is at a minimum in the middle and increases substantially hyperbolically towards the edges. This distribution 22 of stretching is undesirable in many cases and results in higher mechanical stress in the more highly stretched regions and, for example, the capacity of the web to absorb dye fluid and the like may vary in dependence upon the stretch at a particular point, giving rise to noticeable differences in the colour shade of a finished web.

The objective is to achieve a horizontal stretching distribution curve as shown at 23 in FIG. 13. In this case the specific stretching of the web is the same at any position across the width of the web. To this end the peak height S of the helical profile 15" on roller 1' in FIG. 13 is not constant as in FIG. 12 but continuously decreases from the centre of the roller towards the edges, resulting in a shape substantially as shown in FIG. 14. FIG. 14 is, of course a schematic representation of the helical relief at the surface of a roller 1' and a curve illustrating the variation in peak height S over the width of the web. In practice there would of course be many more peaks 17 in the helical relief.

The pitch of the helical relief 15" in FIG. 13 is constant, but the peak height is greatest near the central plane 16 and decreases on either side thereof. Consequently the actual peripheral surface 33 of the roller 1' of FIGS. 13 and 14 fluctuates to some degree about an imaginary cylindrical surface indicated by a chain dotted line 24.

It will therefore be appreciated that an opposed co-operating roller having the same construction or having a peak height corresponding to the maximum peak height in FIG. 14 will produce a greater depth of engagement in the middle of the roll than at the edges. The variation in peak height S across the width of the web is shown by the curve S' in FIG. 14 although it is to be understood that the curve S' may take a different form. In FIG. 13, for example, a corresponding line (shown as a broken line) illustrating the variation in peak height comprises two straight lines sloping down from the central plane 16 towards the edges of the roller. A depth of engagement varying over the length of the roller can also be achieved if the co-operating roller has a cylindrical outer surface. If however the outer surface is not cylindrical, as with the outer surfaces in FIGS. 13 and 14, then the pressure roller must fit the surface accordingly in order to produce uniform pressure across the web.

With the arrangement of FIGS. 13 and 14, the web is stretched to a lesser degree at its edges than it is in the middle due to the reduced depth of engagement at the edges and this counteracts the stretching curve 22 shown in 26

FIG. 12. In the ideal case the distribution of stretching 23 is uniform across the web, as shown by the horizontal line in FIG. 13.

FIGS. 15 to 18 show a modified embodiment of the width-extending device 100 where the device comprises the same main components, that is to say the profiled roller 1, the co-operating rollers 2, 3 and the pressure roller 7, but in this modified embodiment at least one of the rollers 1, 2 which form the width-extending nip 12 is perforated so that a fluid treatment medium can be sucked in or blown out therethrough. In FIG. 15 the perforation of the roller is not shown in the drawing. The area of engagement between rollers 1, 2 is, however, shown on an enlarged scale in FIG. 16. The ribs 32 which form the relief 15 on the rollers 1, 2 engage between each other. In the embodiment shown, through bores 44 extend into the rollers from the troughs between adjacent ribs 32 so that a fluid treatment medium can flow in and out of the roller. The bores 44 are uniformly distributed along the troughs 18.

In the embodiment of FIG. 15 a non-rotatable duct 42 extends along the interior of the co-operating roller 2 and is directed radially outwardly towards the nip 12. As seen in FIG. 15, the rollers 1 and 2 are of hollow and thus each has an inner periphery or surface. The duct 42 is open in a narrow peripheral region directed towards the inner periphery of roller 2 and is sealed at its edges. The duct 42 is connected to a pressure region D and steam or hot water or the like can be directed towards the inner periphery of roller 2 from where this medium flows out through the bores 44 into the nip 12 and into the web 10 as it passes therethrough.

A corresponding duct 43 is formed in the profiled roller 1 and has its opening disposed opposite the opening of duct 42. The duct 43 is connected to a reduced or negative pressure region V so that the medium introduced into the nip 12 via the duct 42 is sucked through the web 10 and the perforations 44 in roller 1 into the negative pressure region. In this way an intense flow is achieved through the web 10 at right angles to its plane as the web is extended in width within the nip 12.

It is to be appreciated however that the arrangement illustrated in FIG. 15 may be modified. Thus, only one duct 42, 43 need be provided and the duct need not be directed towards the nip 12. In addition, the pressure roller 7 may be perforated and provided with means for conveying a fluid treatment medium. Alternatively the rollers 1, 3 could be provided with similar arrangements.

Figure 19:
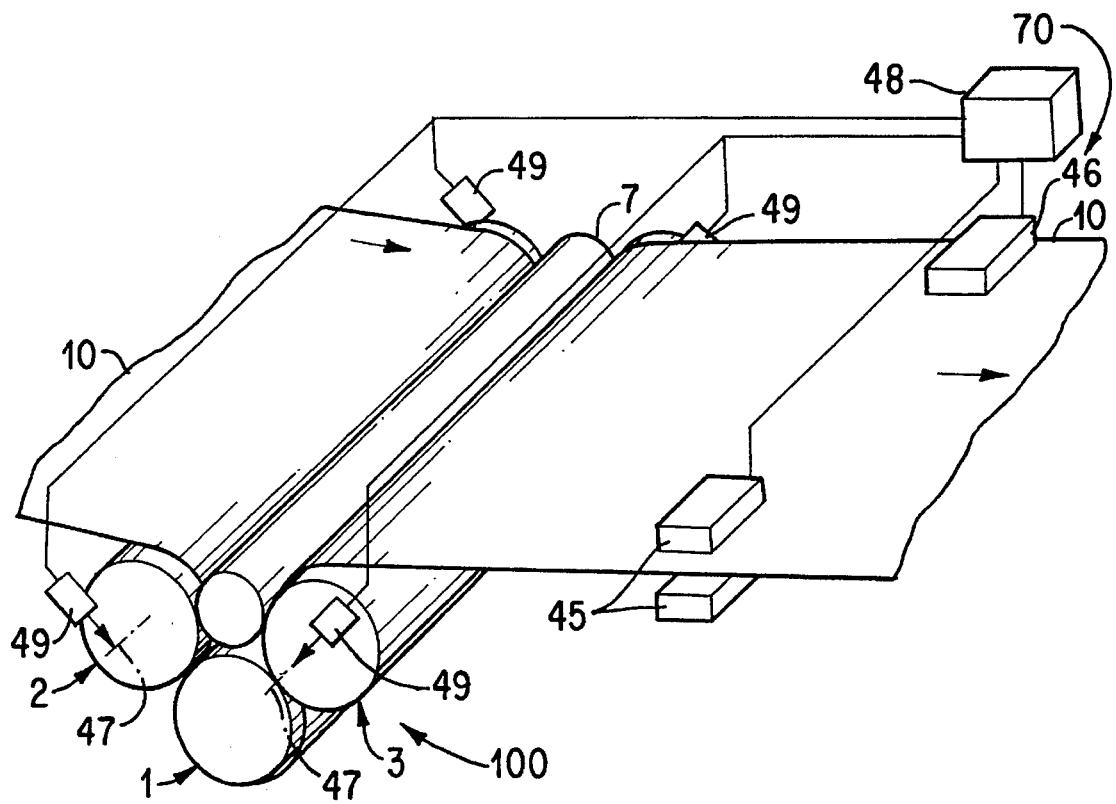
FIG. 19 is a perspective view of a device according to this invention incorporating a width-controlling device.

FIG. 19 shows the width extending device 100 co-operating with a width-regulating device identified as a whole by a reference numeral 70. The width regulating device 70 comprises two detection units 45, 46 disposed opposite one another at the opposed edges of the web 10 at positions where the web has exited the width extending device 100. In one embodiment the detection units may comprise optical units each having a row of diodes disposed at right angles to the edge of the web. Alternatively suitable mechanical sensors or similar devices could be used. The signals from the detection units 45, 46 are fed to a central regulating and control unit 48 in order for the actual value of the instantaneous web width to be evaluated. A control signal based on the actual value of the web width and a predetermined desired value is delivered to two force exerting units 49 which act on the journals 47 of each co-operating roller 2, 3 (the journals being illustrated diagrammatically in FIG. 19) in order to adjust the rollers in the direction of arrows 4, 5 (see FIG. 1) relative to the profiled roller 1. If the measured width of the web is too small then the depth of engagement E (see FIG. 5) between the rollers is increased by increasing the force supplied by the force exerting units 49 thereby maintaining a predetermined desired web width.

Adjusting the stretching of the web by way of the depth of engagement E can be effected other than in the manner shown in FIG. 19. For example, the co-operating rollers 2, 3 can be adjusted in the direction of arrows 4, 5 (see FIG. 1) by way of spindle drives which move the rollers to give a predetermined depth of engagement E. Alternatively, controllable force exerting units may maintain either a predetermined force or a predetermined depth of engagement (a predetermined engagement travel) in a controlled manner.

Figure 20:
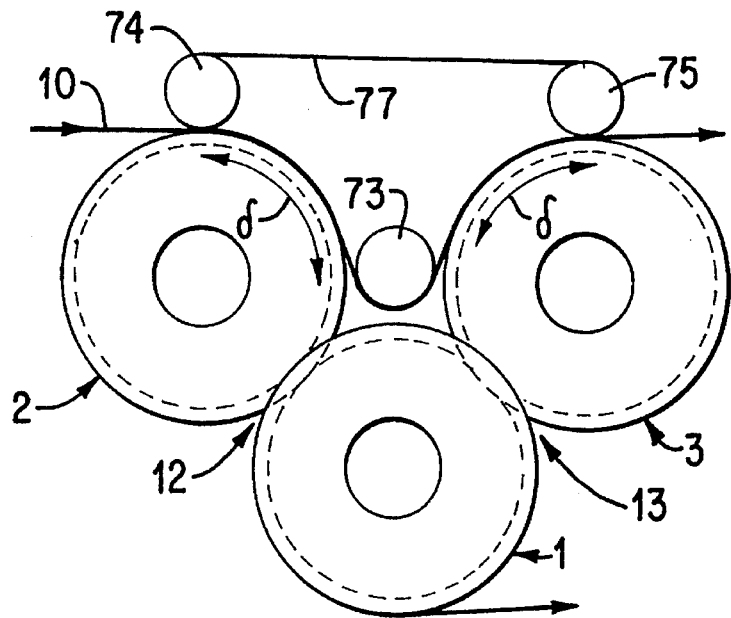
FIG. 20 is a view corresponding to FIG. 1 but where one component of the device is of a modified form.

In the embodiments thus far described the pressure element 7 has taken the form of a roller. FIG. 20 shows an embodiment in which the pressure element is in the form of a belt 77 which runs endlessly over guide rollers 73, 74, 75 which themselves extend parallel to rollers 1, 2 and 3. The belt 77 engages the web 10 over an arc in those regions where the web passes around the outer surface of the co-operating rollers 2, 3. This results in a considerable increase in the region over which pressure is applied by the pressure element, this region corresponding to the arc over which the belt engages the web rather than a point contact. This means that the web 10 can be more effectively held against the co-operating rollers 2, 3 over its width by smaller radial bearing forces. The web is therefore firmly supported over an extended region which may well be desirable when it is to be treated with liquid treatment media. The pressure belt 77 may have a smooth pressure surface or, alternatively, may, as with the pressure roller 7, have a surface relief on that side of the belt which is facing the web 10. As a further alternative the belt 77 may be perforated.

Figure 21:
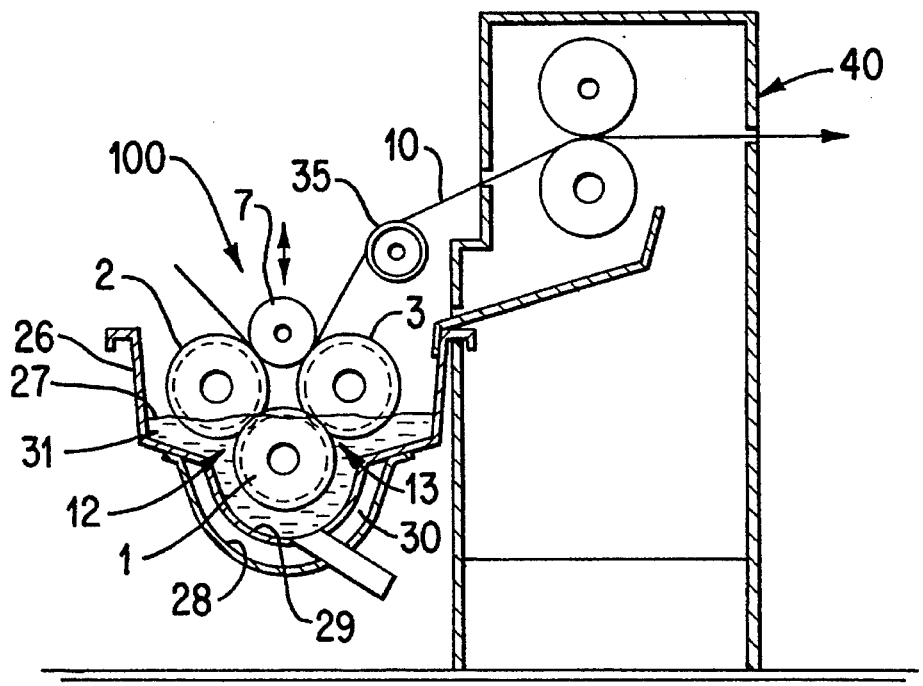
FIGS. 21 to 23 show embodiments of the device of the present invention in different treatment plants.
Figure 22:
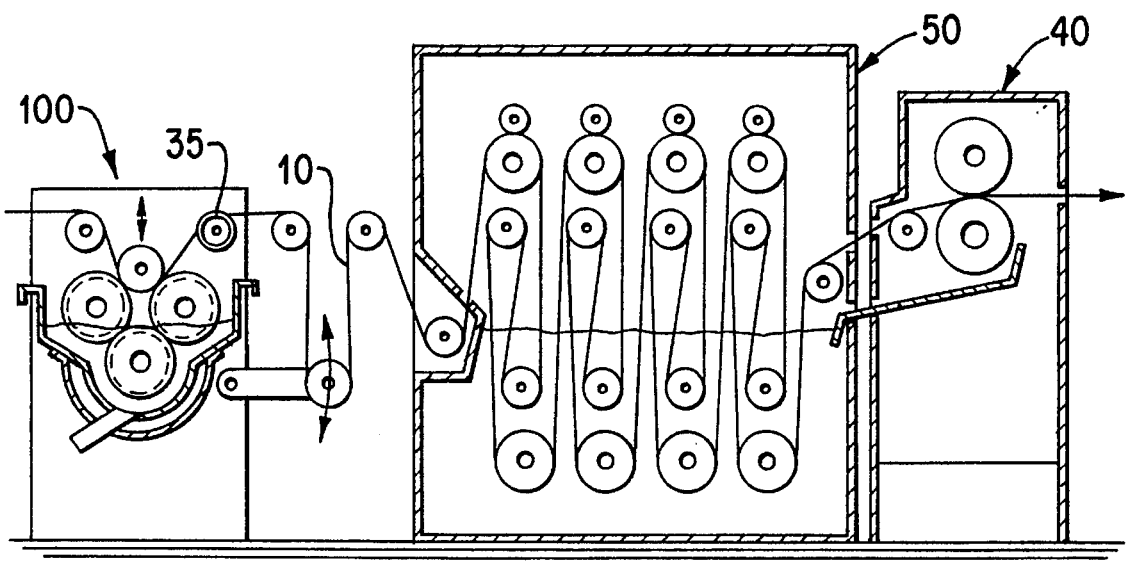
Figure 23:
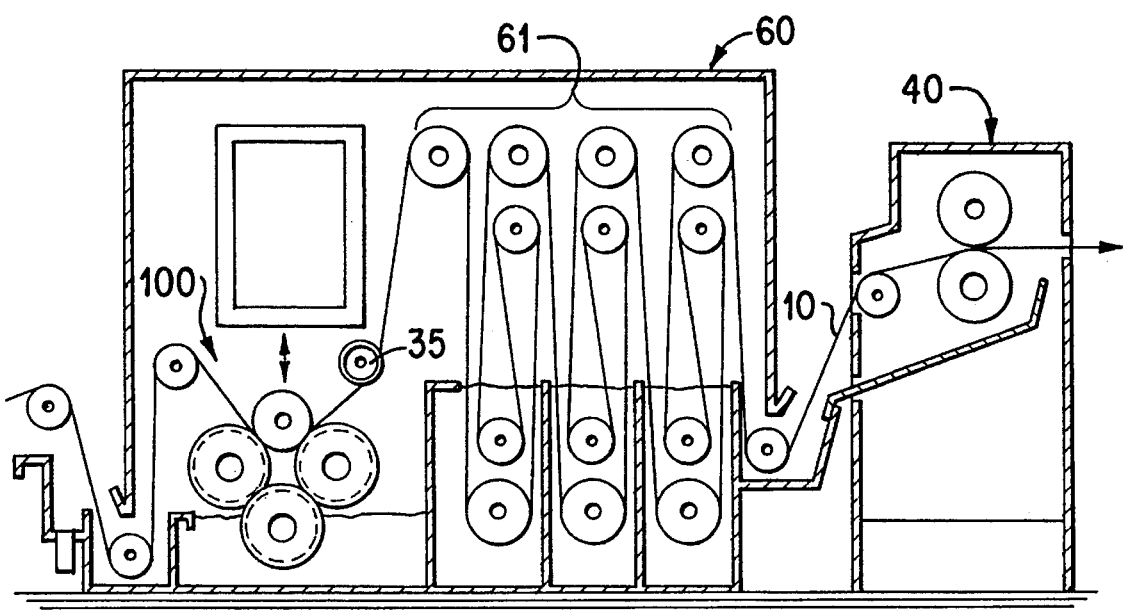

FIGS. 21 to 23 show various ways in which the width extending device 100 may be used in practice.

In FIG. 21 the bottom part of the rollers 1, 2 and 3 are disposed in a trough 26 which is filled to a level 27 with a treatment liquid 31. The trough has a double wall 28, 29 at the bottom, leaving a space 30 therebetween in which a heat transfer liquid can circulate and indirectly heat the treatment liquid. In this manner, the web 10 has a short recovery period as it travels around the bottom part of the profiled roller 1, where it is impregnated with the treatment liquid.

In FIGS. 21 to 23 a width-stretching device 35 is positioned immediately behind the width extending device 100 and pulls out and flattens the web 10 which is slightly 'crinkled' in the transverse direction upon leaving the width extending device 100. It will of course be recalled that the width-stretching device does not in fact increase the width of the web but merely smooths or flattens out the web. The downstream positioning of the width-stretching device 35 is important in order to avoid creasing of the web which may cause stoppages in subsequent downstream treatment stations.

In the embodiment of FIG. 21 the width extending device 100 is disposed in front of a mangle identified by reference numeral 40 in which the treatment liquid 31 is squeezed out of the web.

In the embodiment of FIG. 22 the width extending device 100 is disposed in front of a steam box 50 through which the web passes before passing through a mangle 40.

In the embodiment of FIG. 23 the width extending device 100 is disposed within the casing of a steam box 60 adjacent the actual recovery section 61 in the steam box. After leaving the steam box 60 the web 10 travels through a mangle 40 as in the embodiment of FIG. 22.

We claim:

1. A device for increasing the width of a moving web of material, comprising:

a rotatable profiled roller with an outer surface which defines a primary plurality of radial projections and recesses along its length;

a rotatable first co-operating roller rotatable at the same speed as the profiled roller, with an outer surface which defines a first plurality of radial projections and recesses along its length complimentary to but not contacting said primary plurality of radial projections and recesses;

a rotatable second co-operating roller rotatable at the same speed as the profiled roller, with an outer surface which defines a second plurality of radial projections and recesses along its length complimentary to but not contacting said primary plurality of radial projections and recesses, such that the second plurality of projections extend further into said complementary recesses of said primary plurality than do said first plurality of projections;

a first treatment nip defined by said first co-operating roller and said profiled roller; and a second treatment nip defined by said second co-operating roller and said profiled roller, wherein the first and second treatment nips serve to increase the width of a web of material as the web of material is passed through the first treatment nip defined between the first cooperating roller and the profiled roller and then passes around part of the profiled roller before passing through the second treatment nip defined between the second cooperating roller and the profiled roller.

2. The device of claim 1, further comprising a pressure element which engages against said web at a position relatively close to said first and second nips, such that said pressure element is movable with the moving web of material and has a pressure surface which forces the web of material against the co-operating rollers.

3. The device of claim 2, wherein said pressure element engages said web first as it passes around the first co-operating roller and second as it passes around the second co-operating roller.

4. The device of claim 2, wherein the pressure element has an unbroken pressure surface.

5. The device of claim 2, wherein the pressure element has a perforated pressure surface.

6. The device of claim 2, wherein the pressure element is a pressure roller extending over the length of the co-operating rollers.

7. The device of claim 6, wherein the pressure roller has a flexible coating with a hardness of 50 to 70 Shore D.

8. The device of claim 6, wherein the pressure roller is divided into longitudinal portions, the axes of said longitudinal portions being movable at an angle to one another.

9. The device of claim 2, wherein the pressure element is an endless rotating belt approximately equal in width to the length of the co-operating rollers, said belt engaging the outer surface of the co-operating rollers.

10. The device of claim 1, wherein said pluralities of radial projections and recesses defined by the outer surfaces of the profiled roller and the co-operating rollers form a relief and comprise continuous ribs extending around the periphery of the rollers.

11. The device of claim 1 wherein said pluralities of radial projections and recesses defined by said outer surfaces of the profiled roller and the co-operating rollers form a relief and comprise individual raised portions uniformly distributed over their respective surfaces, such that said raised portions are spaced from one another in the longitudinal and peripheral directions.

12. The device of claim 11 wherein said individual raised portions are in the form of knobs or diamond-shaped lands.

13. The device of claim 1 wherein said pluralities of radial projections have peaks which are spaced apart in the longitudinal direction of the roller by a distance of between 5 and 30 mm.

14. The device of claim 1 wherein the radial projections define peaks and the radial recesses define troughs, such that said peaks and troughs each lie on an imaginary cylindrical surface and the radial distance between the cylindrical surfaces is between 5 and 20 mm.

15. The device of claim 1 wherein the depth of penetration of the projections on the co-operating rollers in the recesses of the profiled roller decreases towards the ends of the rollers.

16. The device of claim 15 wherein the peaks of the projections on the roller surfaces lie on a surface of rotation which is symmetrical about a central plane extending at right angles to the longitudinal axis of the roller, and the radius of the surface of rotation increases in a direction from the ends of the roller towards the central plane of the roller.

17. The device of claim 1 further comprising a device for supplying a liquid treatment medium to the web near one of the treatment nips.

18. The device of claim 17 further comprising a device for sucking a liquid treatment medium through the web near one of the treatment nips.

19. The device of claim 1 wherein at least one of the rollers forming the first treatment nip is perforated and the interior of the roller is connected to a device for blowing a liquid treatment medium out or sucking it in.

20. The device of claim 19 wherein one of the rollers forming the first treatment nip is connected to a device for blowing out a liquid treatment medium towards the nip, and the other roller is connected to a device for sucking in a liquid treatment medium from the nip.

21. The device of claim 1 wherein said web passing through the device extends around the outer surface of the profiled roller by an angle $\alpha$ and said web extends around the outer surfaces of the first and second co-operating rollers by angles $\beta$ and $\gamma$ respectively, such that the angle $\alpha$ is equal to the sum of the angles $\beta$ and $\gamma$.

22. The device of claim 1 wherein the profiled roller dips partly into a treatment liquid.

23. The device of claim 1 wherein said rollers are adjustable to provide a predetermined depth of penetration of said plurality of radial projections on one roller into said plurality of radial recesses of another roller.

24. The device of claim 1, wherein the rollers are adjustable to provide a predetermined force urging the rollers defining a nip towards each other.

25. The device of claim 23, further comprising a batch identification means which responds to markings on the web and which is used to control the adjustment of the rollers.

26. The device of claim 1, further comprising means for measuring the moving web, such that said measuring means is connected to a means for controlling said rollers.

27. The device of claim 1, wherein said device is disposed in front of a width-stretching device.

28. The device of claim 1, wherein said device is disposed in front of a mangle.

29. The device of claim 1, wherein said device is disposed in front of a steam box and is outside the casing thereof.

30. The device of claim 1, wherein said device is disposed in front of the actual recovery section in a steam box.

* * * * *

UNITED STATES PATENT AND TRADEMARK OFFICE
CERTIFICATE OF CORRECTION

PATENT No. : 5,455,992  Page 1 of 2

DATED : October 10, 1995

INVENTOR(S): Wolfgang Kurschatke et al.

It is certified that error appears in the above-identified patent and that said Letters Patent is hereby corrected as shown below:

Column 1, between line 3 and 4 insert

--BACKGROUND OF THE INVENTION--;

Column 1, line 32, after "trough" insert --between--;

Column 6, line 58, insert paragraph

--In order that the present invention may be more readily understood and so that further features thereof may be appreciated, the invention will now be described by way of example, with reference to the accompanying drawings in which:--

Column 7, line 31, after "rollers;" a new paragraph should begin with

Figure 16:
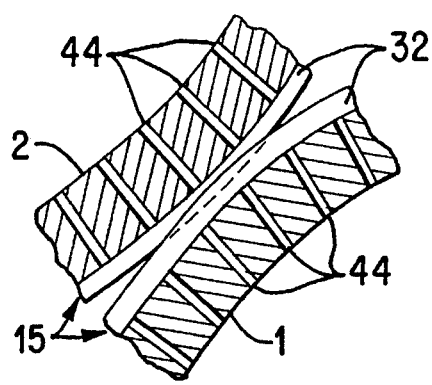
FIG. 16 is an enlarged view showing the region of engagement between two co-operating rollers of FIG. 15.
Figure 17:
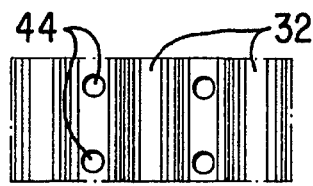
FIG. 17 is an enlarged external view of the relief on the outer surface of one of the rollers of FIG. 16.
Figure 18:
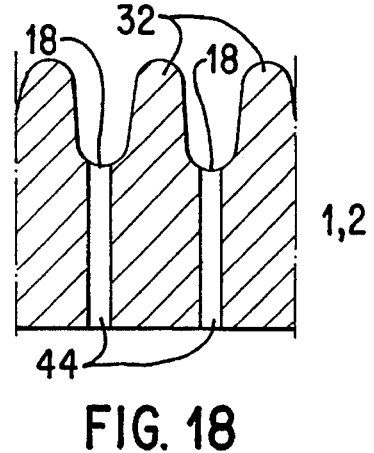
FIG. 18 is a longitudinal cross-sectional view through the axis of a roller of FIGS. 15 to 17 showing the peripheral region thereof.

--Figure 16--;

UNITED STATES PATENT AND TRADEMARK OFFICE
CERTIFICATE OF CORRECTION

PATENT No. : 5,455,992

DATED : October 10, 1995

INVENTOR(S): Wolfgang Kurschatke et al.

It is certified that error appears in the above-identified patent and that said Letters Patent is hereby corrected as shown below:

Column 11, line 67, delete "26"; and

Column 12, line 23, delete "of".

Signed and Sealed this

Thirteenth Day of August, 1996

*Attest:*

BRUCE LEHMAN

*Attesting Officer*     *Commissioner of Patents and Trademarks*